(12) United States Patent
Gladis et al.

(10) Patent No.: US 9,619,837 B2
(45) Date of Patent: Apr. 11, 2017

(54) SYSTEM AND METHOD FOR DETECTING AND UTILIZING NON-BIDDING ACTIVITY OF BIDDERS IN AN ONLINE AUCTION

(71) Applicant: Ten-X, LLC, Irvine, CA (US)

(72) Inventors: Todd Gladis, San Clemente, CA (US); James Corum, Irvine, CA (US); Robert Michealis, Irvine, CA (US); Sheridan Hitchens, Irvine, CA (US); Harshal Dedhia, Irvine, CA (US)

(73) Assignee: Ten-X, LLC, Irvine, CA (US)

( * ) Notice: Subject to any disclaimer, the term of this patent is extended or adjusted under 35 U.S.C. 154(b) by 147 days.

(21) Appl. No.: 14/214,679

(22) Filed: Mar. 15, 2014

(65) Prior Publication Data

US 2014/0289065 A1     Sep. 25, 2014

Related U.S. Application Data

(60) Provisional application No. 61/852,399, filed on Mar. 15, 2013, provisional application No. 61/852,086, filed on Mar. 15, 2013, provisional application No. 61/852,087, filed on Mar. 15, 2013.

(51) Int. Cl.
| | |
|---|---|
| G06Q 30/00 | (2012.01) |
| G06Q 30/08 | (2012.01) |
| G06Q 30/02 | (2012.01) |
| G06Q 30/06 | (2012.01) |
| G06Q 10/04 | (2012.01) |

(52) U.S. Cl.
CPC ......... *G06Q 30/08* (2013.01); *G06Q 30/0202* (2013.01); *G06Q 30/0641* (2013.01); *G06Q 10/04* (2013.01); *G06Q 30/0601* (2013.01)

(58) Field of Classification Search
USPC .............................................. 705/26.1–27.2
See application file for complete search history.

(56) References Cited

U.S. PATENT DOCUMENTS

| | | | |
|---|---|---|---|
| 7,447,646 B1 * | 11/2008 | Agarwal | G06Q 20/201 |
| | | | 705/26.3 |
| 7,548,884 B1 | 6/2009 | Thomas | |
| 7,707,153 B1 | 4/2010 | Petito et al. | |
| 2002/0065763 A1 | 5/2002 | Taylor et al. | |
| 2002/0123959 A1 | 9/2002 | Mozley et al. | |

(Continued)

FOREIGN PATENT DOCUMENTS

JP      2002-170004 A      6/2002

OTHER PUBLICATIONS

Zeithammer, Robert, Forward-Looking Bidding in Online Auctions, Aug. 2006, Journal of Marketing Research, pp. 462-476.*

(Continued)

*Primary Examiner* — Jeffrey A Smith
*Assistant Examiner* — Lindsey Smith
(74) *Attorney, Agent, or Firm* — Fish & Tsang LLP

(57) ABSTRACT

The non-bidding activity of one or more bidders of an auction is detected over an online interface of the auction environment. The activity of the one or more bidders is detected while the one or more bidders are participating in the auction. The non-bidding activity is correlated to an interest metric for the auction. Information is communicated that is based on the interest metric. The information can be communicated to either a seller or a bidder of the auction.

17 Claims, 7 Drawing Sheets

(56) References Cited

U.S. PATENT DOCUMENTS

| | | |
|---|---|---|
| 2003/0014349 A1 | 1/2003 | Guler et al. |
| 2004/0128224 A1 | 7/2004 | Dabney et al. |
| 2005/0108125 A1 | 5/2005 | Goodwin et al. |
| 2005/0197950 A1 | 9/2005 | Moya et al. |
| 2005/0278243 A1* | 12/2005 | Ghani ............... G06Q 40/04 705/37 |
| 2005/0288957 A1 | 12/2005 | Eraker |
| 2008/0046343 A1 | 2/2008 | Maguire et al. |
| 2008/0147566 A1 | 6/2008 | Malik |
| 2009/0030768 A1 | 1/2009 | Ginter et al. |
| 2009/0198608 A1 | 8/2009 | Jain et al. |
| 2010/0131835 A1* | 5/2010 | Kumar ............. G06Q 30/0224 715/205 |
| 2011/0004560 A1 | 1/2011 | Knake et al. |
| 2012/0136776 A1 | 5/2012 | Haberaecker et al. |
| 2012/0233011 A1* | 9/2012 | Barlow ............... G06Q 30/08 705/26.3 |
| 2012/0246024 A1 | 9/2012 | Thomas et al. |
| 2013/0159142 A1 | 6/2013 | Moreno et al. |
| 2013/0325623 A1 | 12/2013 | Balduf et al. |

OTHER PUBLICATIONS

Non-Final Office Action dated Dec. 19, 2014, U.S. Appl. No. 14/214,440, 20 Pages.
Non-Final Office Action dated Mar. 24, 2015, U.S. Appl. No. 14/214,681, 21 Pages.
International Search Report and Written Opinion mailed Aug. 18, 2014, Application No. PCT/US2014/029895, 8 pages.
Non-Final Office Action dated Jul. 16, 2015, U.S. Appl. No. 14/214,694, 10 Pages.
Final Office Action dated Jul. 14, 2015, U.S. Appl. No. 14/214,440, 23 Pages.
International Search Report and Written Opinion mailed Jun. 29, 2015, Application No. PCT/US2015/022803, 10 Pages.
International Search Report and Written Opinion mailed Aug. 20, 2014, Application No. PCT/US2014/029890, 8 Pages.

* cited by examiner

SYSTEM AND METHOD FOR DETECTING AND UTILIZING NON-BIDDING ACTIVITY OF BIDDERS IN AN ONLINE AUCTION

RELATED APPLICATIONS

This application claims benefit of priority to:
Provisional U.S. Patent Application No. 61/852,399, filed Mar. 15, 2013
Provisional U.S. Patent Application No. 61/852,086, filed Mar. 15, 2013; and
Provisional U.S. Patent Application No. 61/852,087, filed Mar. 15, 2013;
Each of the aforementioned priority applications being hereby incorporated by reference in their respective entirety.

TECHNICAL FIELD

Examples described herein relate to online auctions, and more specifically to a system and method for profiling auction assets and/or participants to predict an auction outcome.

BACKGROUND

Numerous online auction forums exist that enable consumers and sellers to transact for various kinds of items, such as collectibles, electronics and other goods or services. As online auctions become more commonplace, more expensive assets are transacted through the auction forums. In particular, assets such as real property items are regularly exchanged by way of online auctions, often in situations where participants bid on assets using online tools and research.

DETAILED DESCRIPTION

Figure 1:
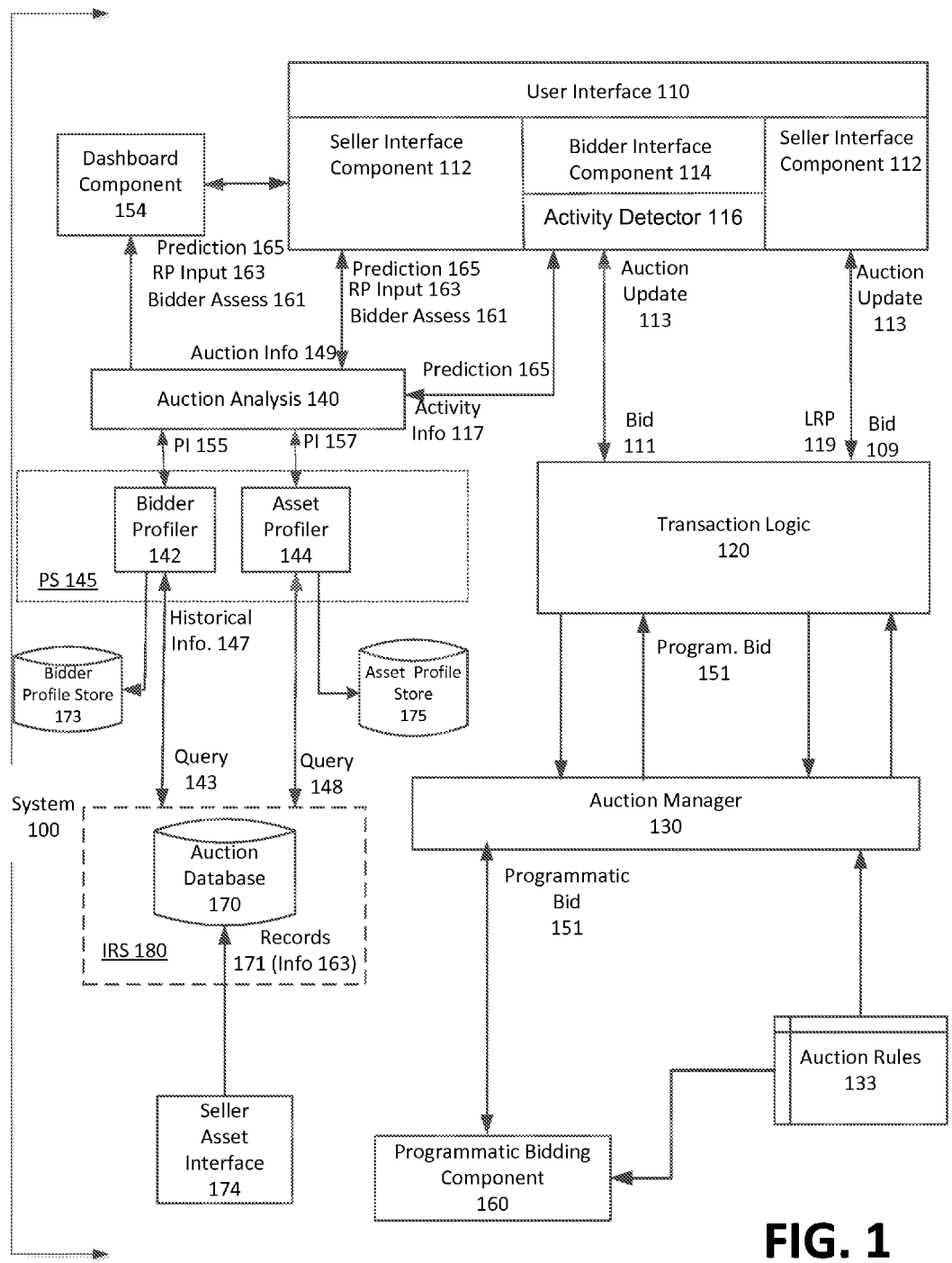
FIG. 1 illustrates an example system for implementing an auction forum in which profiling is used to determine information for predicting auction outcomes.

Examples described herein include a system and method for profiling auction assets and/or participants to predict an auction outcome.

More specifically, examples described herein pertain to conducting an auction in an online auction environment. In an embodiment, a profile of one or more users of the online auction environment is developed. The profile of each user can be based at least in part on historical auction activity of that user. An auction hosted in the online auction environment is monitored. A prediction is determined as to whether the auction will be successful based at least in part on the profile of the one or more users that are participating in the auction.

In a variation, one or more predictive reserve prices are determined for the auction based at least in part on the profile of one or more users that are participating in the auction. By way of example, the determined reserve price(s) can be probabilistic.

In another variation, a predicted transaction price (e.g., top or winning bid) is determined for the auction based at least in part on the profile of one or more users that are participating in the auction. Also as an example, the determined transaction price can be probabilistic.

According to another embodiment, an auction is conducted for an online auction environment. A set of characteristics are determined for a given asset of the auction, and asset profile information is determined for the given asset based on the set of characteristics. In particular, the asset profile information can be determined from one or more prior auctions provided at the online auction environment. The asset profile information can be based on one or more corresponding assets, each of which are deemed to be comparable to the given asset based on the one or more corresponding assets each having a set of characteristics that are similar to the set of characteristics of the given asset of the auction. A prediction is made as to whether the auction of the given asset will be successful based at least in part on the asset profile information.

By way of example, the prediction can be (i) probabilistic, include so as to multiple possible outcomes and probabilities, (ii) value based, to indicate specific values, and/or (iii) binary ("yes" or "no") or qualitative ("good" or "lower reserve price").

In a variation, the asset profile information is used to determine a reserve price of the auction. By way of example, the determined reserve price can be probabilistic.

In another example, one or more auctions of a seller are monitored. An interface is provided that includes auction event information for each of the one or more auctions of the seller. As an example, the auction event information can include a top bid, and an indication as to whether a reserve price has been met. Predictive information is determined for each of the one or more auctions of the seller. Information is displayed based on the predictive information using the interface. The displayed information can indicate a probability as to whether the auction will be successful.

Still further, in some embodiments, non-bidding activity of one or more bidders of an auction is detected over an online interface of the auction environment. The activity of the one or more bidders is detected while the one or more bidders are participating in the auction. The non-bidding activity is correlated to an interest metric for the auction. Information is communicated that is based on the interest metric. The information can be communicated to either a seller or a bidder of the auction A user can be a participant of the auction by performing some activity in connection with that auction, such as bidding, registering for the auction, or actively monitoring the auction (e.g., viewing a web page of the auction).

In at least some embodiments, an online auction environment can be provided from a website where an auction is conducted.

An auction is successful if it ends with a transaction, meaning a transaction price has been determined from the auction, and the transaction has been completed (e.g., exchange of funds and item being auctioned) after the auction is completed. In typical cases, a successful auction is provided by a user providing a bid that exceeds a reserve price of the seller (if one is specified). A successful auction can also occur when the highest bid fails to exceed the reserve price, but the seller agreed to accept the higher bid even though the reserve was not met. Additionally, instances can occur when a bidder or seller fails to follow through on the transaction after the auction is complete. For example, the highest bidder may renege on the auction after it is complete. In real-estate, a closing process may follow the auction which can result in the transaction falling through when one or both parties to the transaction back out. Thus, in some instances, the successful auction will also mean that the highest bidder will have their bid accepted (e.g., above reserve, or below reserve and accepted by seller) and will also follow through on the transaction after the auction is complete.

The profile of individual users can include a quantitative and/or qualitative assessment of each user as a bidder, seller or other participant (e.g., viewer) of auctions. According to one aspect, the profile can include or correspond to a score, which quantitatively assesses the user in an auction role (buyer, seller). For example, the score of the user can assess the quality of the user as a bidder.

In one aspect, a user registers for an auction by performing a registration action through the online auction environment. The registration action can correspond to the user providing log-in information or user identifier through, for example, a network site where the online auction environment is provided. Alternatively, the registration action can correspond to the user sending a communication to the online auction environment or seller to request participation in a particular auction.

Additionally, in some examples a user can participate in an auction as a bidder by registering for the specific auction. For example, a user may have an account for an auction forum that grants the user the right to separately register for individual auctions. When the user identifies an auction of interest, the user can follow a sign-in or registration process that identifies the user as a bidder for the particular auction.

A user can participate in an auction as a bidder by monitoring the auction, and showing interest as a potential bidder. For example, a bidder can correspond to a user who registers for an auction. Such a user can correspond to a bidder whether the user actually provided a bid or not in the auction.

Among other benefits, examples described herein achieve a technical effect by providing enhanced user interfaces to computing devices that incorporate predictive information to guide participant conduct, such as setting reserve price or anticipating successful outcome. Further, the predictive information can be computationally determined through analysis of database records of prior auction activity. Such analysis can determine profile information for bidders as well as assets, and such profile information can in turn be used to make predictive determinations for guiding user actions in the online auction. In this way, a technical effect is achieved, through, for example, the electronic publication of content that communicates predictive information for guiding participant behavior.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

Auction Architecture

FIG. 1 illustrates an example system for implementing an auction forum in which profiling is used to determine information for predicting auction outcomes. A system 100 such as shown by an example of FIG. 1 can be implemented in connection with an online auction service for any type of commercial item, such as, for example, real property items, (e.g., homes, real-estate notes, commercial property), motor vehicles (e.g., automobiles, motorcycles, boats), consumer electronics, collectibles, or clothing. However, examples recognize that predictive information can serve a particular benefit in instances when the asset of the transaction is more costly or requires more legal process to complete than simple exchanges of good for process. Embodiments recognize that in such cases, the use of predictive information can assist successful transaction of the asset through the post-auction stage, thereby benefiting the bidder, seller and auction forum.

In an example of FIG. 1, system 100 includes functionality that can be implemented by processes, logical components and/or modules. In an example of FIG. 1, system 100 includes a user interface 110, transaction logic 120, an auction manager 130, an auction analysis component 140, and an auction database 170. The auction database 170 can retain records that identify items that are to be auctioned, and/or items which are undergoing or have completed an auction.

In some implementations, the auction database 170 is part of an information resource system 180. As described below, one or more profile stores can be maintained with the information resource system 180 for purpose of analysis and determining predictive information. The auction database 170 can retain records of auctions, including past auctions, ongoing or current auctions, and auctions that may be in the pre-auction state. In some implementations, the auction database 170 is coupled to a seller asset interface 174. The seller asset interface 174 enables individual sellers to create records 171 that identify an item for auction. The seller asset interface 174 can enable sellers to specify information 163 that comprise individual records 171 of specific auctions at a given point in time. The information 163 can identify the item being auctioned, the terms of sale, as well as other parameter such as a reserve price (which can be hidden from prospective bidders). In this way, database 170 can retain records 171 of auctions in various states, including pre-auction, in-auction (auction initiated) and post-auction (auction completed).

The user interface 110 can include separate functionality for sellers (seller interface component 112) and bidders (bidder interface component 114). Generally, the bidder interface component 114 includes functionality for enabling bidders to view and participate in an in-progress auction. Accordingly, the bidder interface component 114 can include functionality for enabling a bidder to specify a bid 111, and to monitor in real-time the auction update 113 (e.g., current value of an item being auctioned, number of bids received, whether the reserve price has been met or not, updated top bid, etc.). The bidder interface component 114 can be provided as, for example, a webpage that includes functional elements for enabling the users to provide input (e.g., bids) and to view real-time updates for the in auction while it is in progress. In variations, the bidder interface component 114 can be provided as application content, such as through a display or panel of a network-enabled application. The bidder interface component 114 displays content for a particular auction, which can correspond to information maintained about the auction. The information can be derived from the record 171 of the auction, and can include seller provided information regarding the asset (e.g., pictures, text regarding the asset), as well as event information corresponding to ongoing event such as bids received during the auction and other information as selected through implementation or design.

The seller interface component 112 can also display auction content for the seller. In some implementations, the functionality provided for the seller interface component 112 can resemble that which is provided for the bidder interface component 114. For example, the seller interface component 112 can display auction content, including event information (e.g., top bid, bid increment, time remaining), on a real-time basis, so that the seller can see, for example, the top bid, the number of bids made, the bid increment, or the number of registered bidders for particular auction. In some variations, functionality provided to the seller can include the ability to lower the reserve price in appropriate situations.

The transaction logic 120 can implement operations for progressing the auction towards completion. As shown by an example of FIG. 1, one or more instances of transaction logic 120 can be implemented at a given time in order to conduct an auction and to progress the auction towards completion. The transaction logic 120 can be coupled to database 170 to receive information 163 from records 171 that are to be auctioned. The transaction logic 120 can include functionality to (i) initiate an auction, (ii) advance the auction towards completion, and (iii) end or complete the auction when certain conditions are satisfied (e.g., after completion of time and/or satisfaction of completion rules). In addition to receiving and processing bids 111, the transaction logic 120 provides the auction update 113 to the user interface 110 for participants and users of the auction. The auction update 113 can include, for example, information such as a current price for the item being auctioned, an amount of time remaining in the auction, the number of bidders in the auction, whether the reserve price has been met, and/or comments from other users. Other information that can be updated by the transaction logic 120 and published through the user interface 110 includes identifiers for active bidders, recent bid amounts, current bid increment (which optionally can change based on dynamic bid increment adjustments), comments from other users, and information from other auctions that may be in various states (e.g., pre-auction versus in-progress). The auction update 113 can be published through the user interface 110 to the population of users, including through the seller interface component 112 and/or bidder interface component 114.

In some embodiments, each of the seller interface component 112 and bidder interface component 114 displays qualitative or quantitative content corresponding to, or determined from predictive information. Furthermore, the seller interface component 112 can display seller-specific content determined from predictive information. Also, the bidder interface component 114 can display bidder-specific content determined from the predictive information. The content determined from the predictive information can include, for example, a predicted transaction price (e.g., the predicted final price an auction will close at), or probabilities as to what different transaction prices the auction will close at (e.g., a high probability for low price, low probability for second and higher-price). Examples of predictive information that can be displayed to the seller and not to the bidder via the seller interface component 112 can include a qualitative or quantitative prediction as to whether the reserve price will be met. As a variation, the content determined from the predictive information can include a recommendation as to whether the seller should change the reserve price (e.g., lower the reserve). The recommendation can be made subject to rules that govern when the seller can lower the reserve price. The rules can be implemented as auction rules 133, implemented through the auction manager 130.

In some variations, the bidder interface component 114 can also display content such as the likelihood that the reserve price for the auction will be met. However, as the reserve price is often maintained hidden from the bidder, the predictive information regarding the reserve price may be displayed without displaying the sellers actual reserve price.

In an example of FIG. 1, the auction manager 130 monitors the progress of the auctions through multiple stages, and initiates instances of transaction logic 120 and user interface 110 as necessary. In particular, the auction manager 130 triggers transaction logic 120 to initiate a given auction, so that the auction progresses towards completion in accordance with a set of auction rules. The auction manager 130 operates to control execution of the transaction logic 120, to implement functionality such as when an auction transitions from a pre-auction state into an active auction state, or when an auction is to end (e.g., subject to timer, or timer with conditions or rules).

The auction manager 130 also initiates instances of transaction logic 120, and communicates auction rules 133 to the transaction logic 120 in order to progress the corresponding auctions towards completion. The auction rules 133 can also include completion rules, such as rules which specify conditions that affect the timing of when the auction is to end. For example, the auction manager 130 can implement completion rules which specify when a particular auction is to be extended based on the occurrence of a designated event (e.g., incoming bid is received at a designated time period before the auction is to end without bids).

According to some embodiments, auction manager 130 also implements a programmatic bidding component 160 to generate programmatic bids 151 on behalf of the seller. The programmatic bidding component 160 can implement programmatic bids 151 in accordance with one or more auction rules 133. For example, the programmatic bidding component 160 can generate bids 151 when the programmatic bid is under the reserve price.

In some variations, seller bids 109 can also be provided by the seller via the seller interface component 112. For example, the seller bid 109 can be inputted manually from the seller through the seller interface component 112 (or alternatively, through the dashboard component 154). The seller bid 109 can be received by the transaction logic 120, and used to update the top bid of the auction, subject to conditions such as the top bod being maintained less than the reserve price.

According to some embodiments, one or more profiling components can be used to read data from one or more databases and/or data stores of the information resource system 180. The profiling components can use information, including historical auction activity, in order to predict outcomes or parameters for a given auction.

In one embodiment, a profiling system 145 determines profiles for participants of the auction and/or the assets of a particular auction. In one implementation, the profiling system 145 can include a bidder profiler 142 to develop a profile for each bidder of an auction. The bidder profiler 142 uses information provided from the information resource system 180 in order to develop bidder profile information for individual bidders of a given auction. The individual bidders can be identified by, for example, those bidders that registered for the particular auction, or those bidders who submitted actual bids in the course of an auction. Thus, for example, transaction logic 120 can communicate the identity of an individual bidder to the bidder profiler 142. The bidder profiler 142 can submit a query 143 that identifies the individual bidders of an auction (e.g., ongoing or pre-auction stage), in order to obtain historical information 147 pertaining to the particular bidder. The historical information 147 can identify, for example, what kind of assets the bidder previously provided bids for, the highest bid submitted by each bidder per auction, the number of times the bidder won an auction, and/or the percentage of auctions that the bidder won. For assets such as real estate, the historical information 147 can further be used to obtain, for example, the number of times that the particular bidder won an auction, but failed to close the transaction (e.g., transaction failed after auction closed but before transaction was completed post-auction).

In some variations, the bidder profiler 142 can also develop bidder profiles from information that is external to the auction system. The bidder profiler 142 can use, for example, (i) general information such as a credit report, income etc., and/or (ii) specific information, such as identifying what assets a particular bidder owns. For example, the external information may include identifying a particular bidder as an owner of multiple strip malls. If the asset being sold is a strip mall, the bidder profile can score or make positive determinations as to a successful auction outcome based on the information known about the bidder's assets. Thus, if the bidder owns similar assets (e.g., real-estate properties), then the bidder can be scored in a manner that reflects a more positive outcome for the auction.

As an alternative or addition, the profiling system 145 includes an asset profiler 144. The asset profiler 144 can operate to determine relevant historical information about a particular asset of the auction transaction. For example, in the case of real property items, the asset profiler 144 can obtain characteristics of the asset of the auction, such as the geographic location of the asset, the type of asset (e.g., single-family home, commercial property, etc.), sub-categorization of the asset (e.g., number of bedrooms and baths, townhome or home with lot etc.), material characteristics (e.g., lot size, dwelling size), price range and/or any other material considerations that may affect the value of the asset. In one implementation, the asset profiler 144 obtains information 163 from the record 171 of the auction. For example, the transaction logic 120 can communicate an identifier for the auction record 171, from which the asset profiler 144 determines the characteristics of the asset. From the information 163, the asset profiler 144 can determine the category and subcategory of the particular asset. The asset profiler 144 can generate an asset query 148 for the information resource system 180. The query 148 can identify characteristics for purpose of identifying comparable assets with similar characteristics. Results of the query 148 can be obtained from multiple sources, including, for example, the auction database 170. For example, the query 148 can obtain from the auction database 170 the auction records for prior auctions in which the asset of the transaction had the same or similar characteristics as that of the auction under analysis.

Furthermore, examples recognize that the transactions for assets of real property can be obtained from information resources that are external to the auction environment. Accordingly, some variations include providing the information resource system 180 with an interface to other sources of information for assets. For example, the information resource system 180 can include or be coupled to access information from public records regarding the sales or transactions of real estate in different geographic locations. This information can provide an additional source of information regarding, for example, the value of a real property asset.

Still further, the information resource system 180 can include sources for determining market trends that are relevant to the particular asset. In the case of real-estate, the market trends can include determining valuations of properties of a particular kind and/or in specific geographic locations (e.g., counties, neighborhoods, etc.). As an addition or alternative, the information resource system 180 can also include Broker Price Opinions or Automated Valuation Models for purpose of determining valuation of real-estate assets. The asset profiler 144 can utilize such external information to determine asset profile information 157, which further assists the determination of predictive outcomes for an auction.

The auction analysis component 140 can utilize profile information 155, 157 from one or both of the bidder profiler 142 and asset profiler 144. Each of profile information 155, 157 can correspond to highly relevant historical information about individual bidders or comparable assets, respectively. The auction analysis component can use the profile information 155, 157 to determine one or more of predictive information 165, reserve price input 163, and bidder assessment 161. The profile system 145 can also maintain profile stores 173, 175 for the bidders and/or assets respectively for further use in subsequent auctions in which the same bidders or similar assets are auctioned.

The bidder assessment 161 can form a quantitative or qualitative assessment of the individual bidders of the auction. In determining the quantitative assessment, the auction analysis component 140 can determine, from the profile information 155, one or more of the following: the number of times the bidder exceeded the reserve price, the average and/or median of the bidder's highest bids across multiple auctions, the number of times the bidder won an auction, the bidder's ratio of auctions that the bidder won, and/or the highest bid made by the particular bidder. For certain transaction type such as real property assets, the bidder assessment 161 can also identify the number of times the bidder won the auction, but failed to close the transaction. The bidder assessment 161 can provided as one score or rating, multiple scores ratings, or a qualitative evaluation (e.g., "good bidder" or "bidder that typically exceeds reserve").

The reserve price input 163 can be used to identify predictive and/or statistical information about one or more reserve prices for the particular auction. The reserve prices can include the existing reserve price, or a hypothetical or possible reserve price (e.g., should such reserve price be selected). In determining the reserve price input 163, the auction analysis component 140 can utilize one or both of profile information 155, 157. The reserve price input 163 can correspond to, for example, one or more of the following: a recommended reserve price for an auction (e.g., an auction that is in a pre-auction state or which has no reserve price); for different possible reserve prices, a statistical analysis as to the likelihood that the particular reserve price will be met during the auction (or alternatively whether the seller will accept the highest bid); whether the selected reserve price of the seller should be lowered (based in part on the likelihood that the selected reserve price will fail to be met). In more detail, the recommended reserve price as determined by the auction analysis component 140 can correspond to the optimal reserve price that weights chance of success (e.g., reserve price met) with value returned. For example, the recommended reserve price can be set to be the reserve price that has a 50% chance of being met during the auction.

The determination of the recommended reserve price can be based on the asset profile information 157, which can incorporate the transaction price of prior auctions (or prior real estate transactions as the case may be), and/or prior reserve prices for similar assets. As an addition or alternative, the recommended reserve price can weight or otherwise factor in information obtained from the bidder profile information 155. For example, the recommended reserve price can be increased if one or more of the bidders is known to have consistently exceeded the reserve price, or if one or more of the bidders has a history of providing a bid that exceeds the reserve price by some percentage amount. Likewise, the recommended reserve price can be lowered if the profile information 155 indicates that the bidders of the particular auction have not historically met the reserve, or who are "lowball bidders."

Statistical analysis of one or multiple reserve prices can similarly be obtained from asset profile information 157. For example, the asset profile information 157 can identify comparable assets from multiple transactions in prior auctions, including the price at which such assets were sold, the reserve prices in which the assets were provided at, and other information which may indicate the relative value or most effective reserve price of the assets of the prior auctions as compared to the current auction. Furthermore, in some variations, the information resource system 180 can utilize external records, in order to obtain information about asset such as real property assets, including comparable transactions of property items. Based on information obtained from multiple possible data points, a statistical analysis of one or more multiple reserve prices can be obtained. For example, for a particular reserve price X, the auction analysis component 140 can determine the likelihood of 80% success (e.g., the auction bidding will meet the reserve price), while for a higher reserve price 1.20x, the auction analysis component 140 can determine the likelihood of 50% success. Additionally, the statistical analysis can be weighted to account for information known about the bidders, such as past bidding history of the bidders (e.g., the number of times bidders exceeded the reserve, the highest bid of each bidder, the median or average of each bidder, etc.).

Other predictive information 165 can also be determined by auction analysis component 140 using profile information 155 and/or 157. The predictive information can include, for example, the most likely price (or highest bid) of the transaction, or an assessment as to whether the auction will be successful given the likely top bid and the current reserve price. The asset profile information 157 can be used to identify, for example, comparable assets in prior auctions, in order to identify what other assets with similar characteristics have received in terms of bids, highest bids, or eventual sale price. Additionally, information resource system 180 can include external sources, such as recorded transaction prices for real property in a given geographic location, to determine valuation. The auction determination component can determine the predictive information 165 for comparing, for example, the listed reserve price to one or more of (i) the valuation of the real property, and/or (ii) the high bid(s) received for comparable assets in other auctions or in offline transactions.

Still further, in a variation, the assessment as to whether the auction will be successful can further incorporate information from the bidder profile, including information indicating whether one or more bidders has a tendency to win the auction at or over the reserve price. In this way, the bidder profile information 155 can weigh or factor into determining predictive information 165 based on asset profile information 157.

The output of the auction analysis component 140 can be provided to the user interface 110. However, according to some embodiments, at least some of the predictive information generated from the auction analysis component 140 can be provided in a manner that is seller-specific or bidder-specific. Seller-specific predictive information can be displayed only to a seller of the auction, while bidder-specific information can be displayed only to the bidders of the auction. For example, seller interface component 112 can receive reserve price input 163. By way of example, the reserve price input 163 can correspond to a recommendation of a reserve price, or alternatively to a quantitative statistical analysis as to an auction outcome (e.g., reserve price met or not met) for different reserve prices. In some implementations, the reserve price input 163 can be displayed only to the seller to advise the seller whether the reserve price (which is typically kept hidden from bidders) should be lowered or not.

In connection with lowering the reserve price, some examples provide that the auction analysis component 140 can also recommend or programmatically implement a seller bid in order to raise the top bid towards the reserve price. Likewise, in one implementation, only the seller receives bidder assessment 161, to indicate a score or qualitative assessment as to the quality of the bidders registered (or alternatively making bids) for the seller's auction. In still another variation, the bidder interface component 114 can display content from the predictive information that is specific for the bidder or class of bidders. For example, bidders may view content corresponding to predictive information 165, displaying the chance that the auction will succeed based on, for example, the reserve price (which may not be displayed to the user), the top bid, and the assessment of the other bidders. Still further, the bidder interface component 114 can display qualitative or quantitative information indicating the quality (e.g., likelihood that individual bidders will follow through on bidding, meeting reserve etc.) of the other bidders that are participating in a particular auction.

Figure 6:
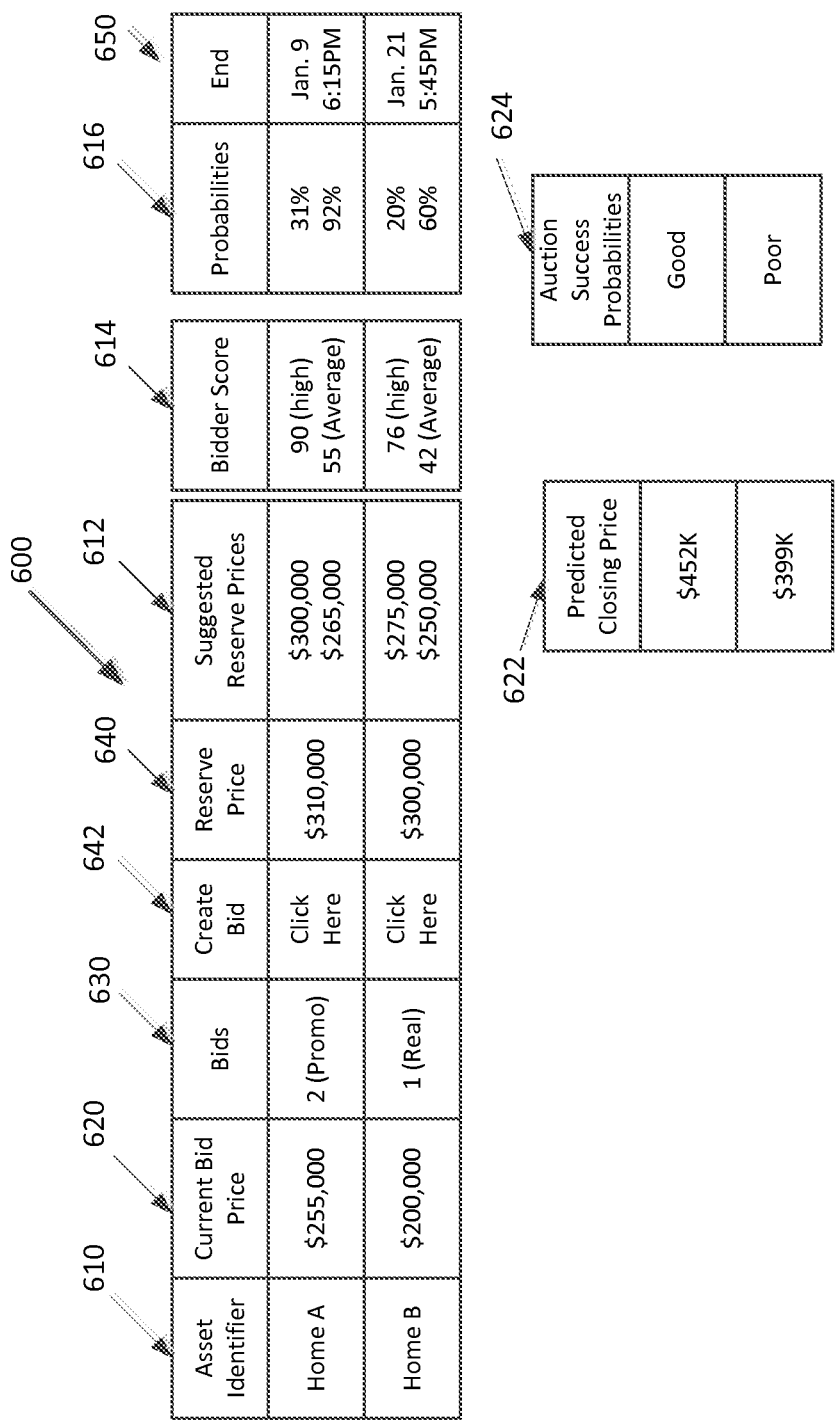
FIG. 6 illustrates an example of a dashboard for use by a seller to manage one or more auctions.

In some embodiments, the seller interface component 112 can be provided as a dashboard component 154. The dashboard component 154 can optionally be displayed as a programmatic element that is separate from a browser or webpage. By way of example, the dashboard component 154 can correspond to a standalone application that accesses a network site where the auction is hosted. In variations, the dashboard component 154 can correspond to a plug-in, such as a plug-in component that operates in connection with a browser, independent of the browser accessing or displaying a website of the auction. An example of a dashboard component 154 is illustrated by FIG. 6. The dashboard component 154 can display auction status information (e.g., auction status, top bid, whether reserve price has been met, number of bidders, number of bids etc.). Additionally, in some variations, the dashboard component 154 can display predictive information provided by the auction analysis component 140, including information corresponding to the bidder assessment 161, the reserve price input 163 and/or the prediction information 165. Still further, in some implementations, the dashboard component 154 can be used by the seller to provide input, such as input corresponding to trigger a seller bid 109, or input that lowers the reserve price (LRP 119).

While an example of FIG. 1 utilizes historical information to determine bidder profile information and predictive information, some implementations can utilize real time monitoring to anticipate or otherwise provide indicative information of bidder action. For example, bidder interface component 114 can include inactivity detector 116, which detects bidder activity that signals bidder interest, without affirmative action in which the bidder places a bid. The bidder activity detector 116 can, for example, detect the user monitoring a page on which the auction is provided, hovering over bid submission 'button' or icon, and/or placing a bid but withholding a submit action. In this way, the activity detector 116 can detect action other than bid submission. The activity detector 116 can record such activity information 117, and the auction analysis component 140 can use the activity information in determining one or more predictions for the auction. For example, the auction analysis component 140 can determine that there is a likelihood of more bids being submitted based on one or more bidders performing actions that serve as markers for bidding interest (e.g., the bidder repeatedly hovering over the bid submission button on a page of the auction), thus increasing the chance that the reserve price for the auction will be met. Furthermore, if the auction is already above the reserve price, the activity information 117 can indicate a likelihood that additional bidding will take place, and the auction analysis component 140 can raise the anticipated top bid of the auction in predicting the transaction price of the auction for either the seller or the bidders.

Methodology

Figure 2:
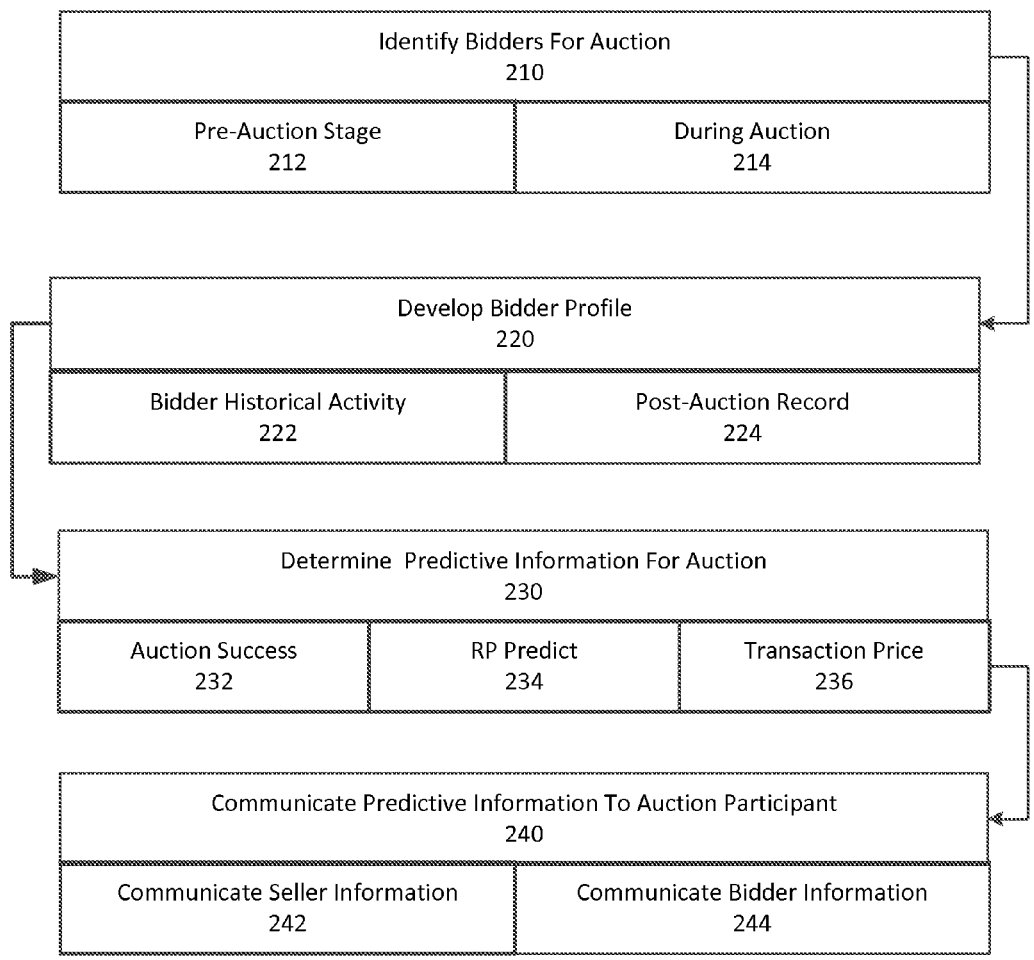
FIG. 2 illustrates an example method for determining a bidder profile for purpose of providing predictive information for an auction.
Figure 3:
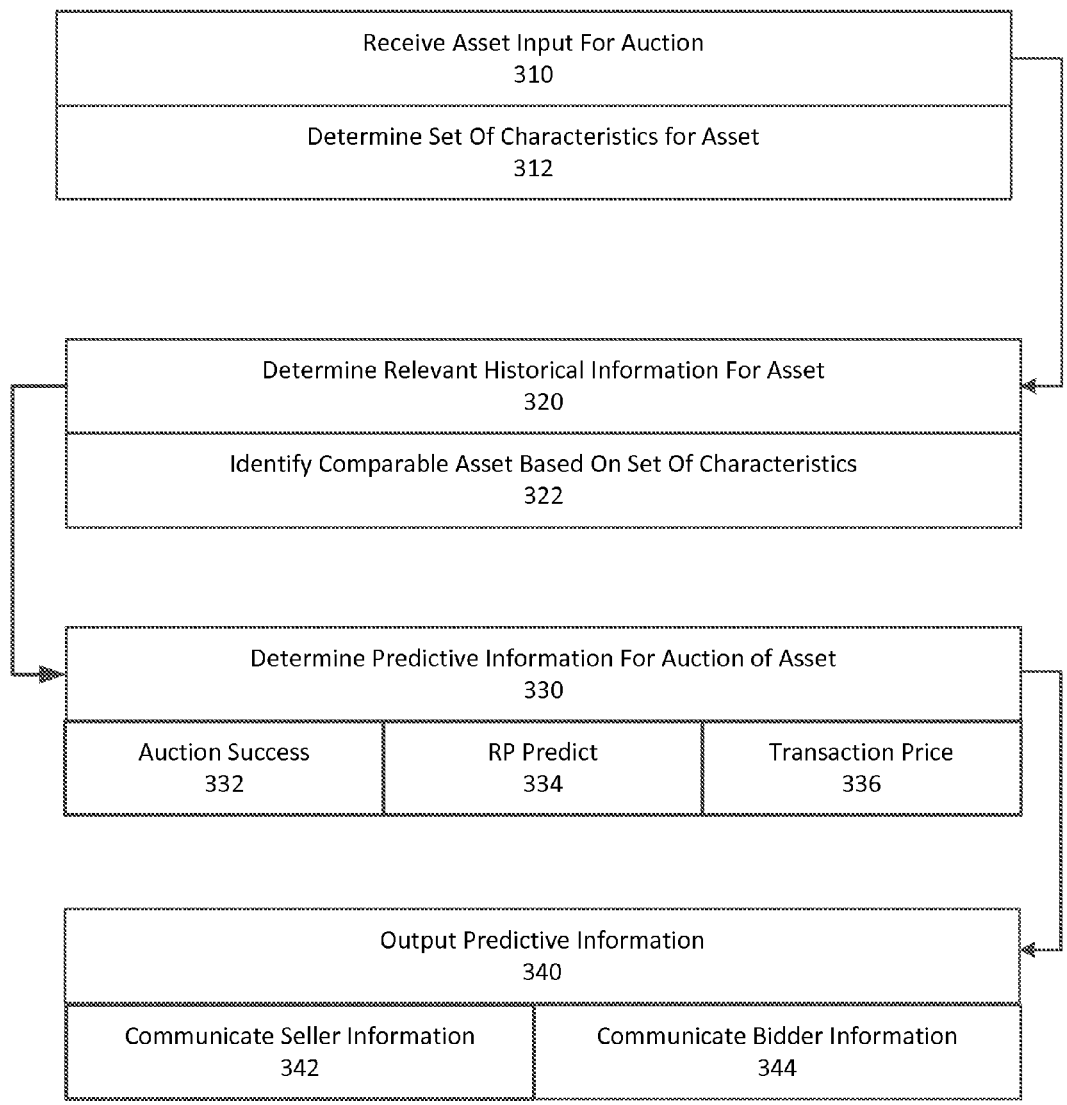
FIG. 3 illustrates an example method for determining an asset profile for purpose of providing predictive information for an auction.
Figure 4:
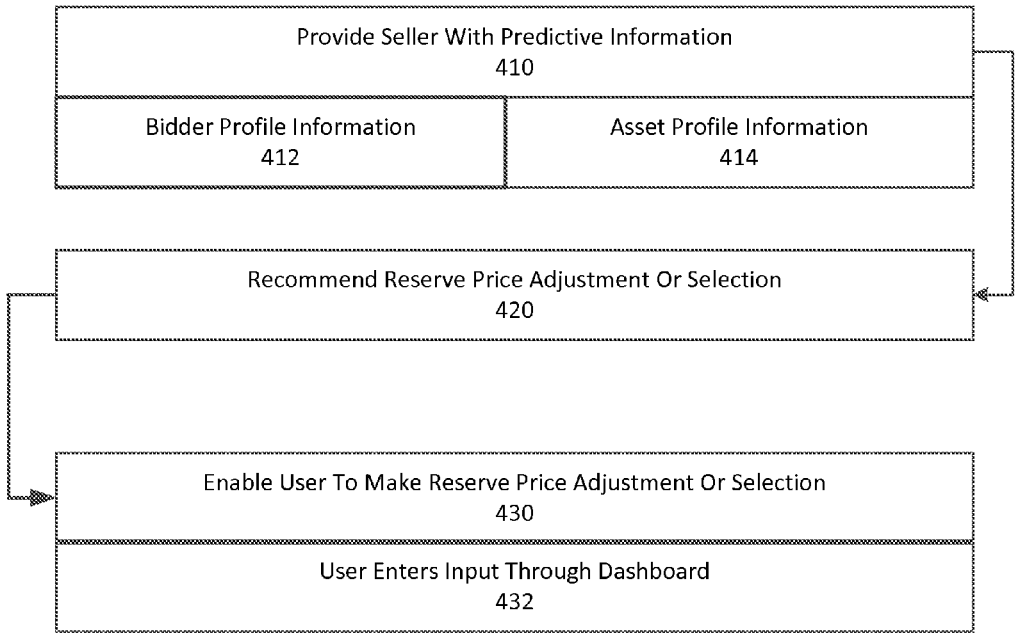
FIG. 4 illustrates an example method for providing predictive information to a seller for purpose of enabling the seller to take action to successfully complete the auction.
Figure 5:
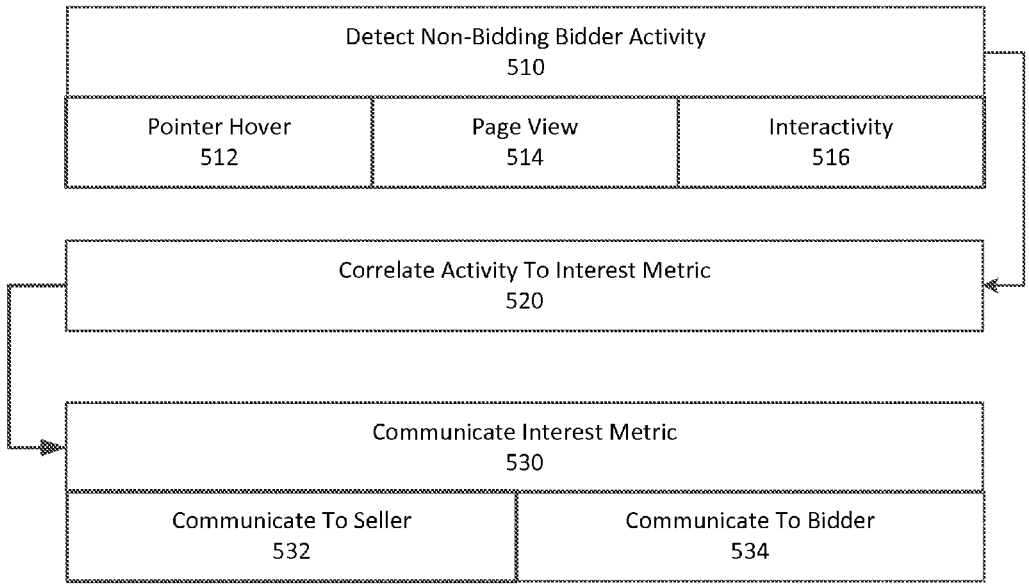
FIG. 5 illustrates an example method for detecting bidder activity that can be correlated to bidder interests for purpose of predicting auction activity.

FIG. 2 illustrates an example method for determining a bidder profile for purpose of providing predictive information for an auction. FIG. 3 illustrates an example method for determining an asset profile for purpose of providing predictive information for an auction. FIG. 4 illustrates an example method for providing predictive information to a seller for purpose of enabling the seller to take action to successfully complete the auction. FIG. 5 illustrates an example method for detecting bidder activity that can be correlated to a bidder interest level for purpose of predicting auction activity. Methods such as described by examples of FIG. 2 through FIG. 5 can be implemented using, for example, a system such as described by an example of FIG. 1. Accordingly, reference may be made to elements of system 100 for purpose of illustrating suitable components or elements for performing a step or sub-step being described.

With reference to FIG. 2, a set of bidders for an online auction or identified (210). The bidders can be identified as those users who register as bidders for an auction. For example, some online auction formats provide that bidders register for the particular auction beforehand (separate from registration with the auction service), and only registered bidders of the particular auction can bid on a given auction. In variations, the bidders can be determined from those users who actually submit bids, or those users who view the page on which the auction is displayed. In one implementation, the identification of bidders can be made when the auction is in a pre-auction stage (212). For example, for auctions of assets such as real property items, a pre-auction stage can enable registered bidders to perform due diligence (e.g., view the property, inspect document title etc.). A time period can be specified, requiring bidder registration in order to bid for the particular property. The bidder registration provided at this point can enable the identification of the set of bidders.

In a variation, the identification of bidders can be made while the auction is in progress (214). For example, those individuals who submit bids and who have registered with the online auction site can be identified. Alternatively, those bidders whom can be identified by way of programmatic identifier (e.g., stored cookie) or other online personna can be identified.

A profile for one or more of the bidders can be determined (220). In one implementation, the auction analysis component 140 can determine the profile for the bidder based at least in part on historical activity of that individual in other auctions (222). For example, the auction analysis component 140 can scan the auction database 170 for auctions in which the individual bidder previously participated in. The historical activity that is identified for individual bidders can include, for example: (i) the median or average of the high bid the particular bidder in prior auctions that the bidder participated in; (ii) the percentage or ratio of auctions that the bidder previously won; (iii) the particular bidder's top bid in connection with the reserve price for a particular auction, such as the percentage of the bidder's top bid versus the reserve price of prior auctions; and/or (iv) the percentage of the bidders prior auctions in which the top bid provided by that bidder exceeded the reserve price.

In a variation, the profile for the bidder can be based at least in part on the post-auction record of the bidder (224). In particular, bidders who have previously won auctions (e.g., provided the highest bid) can be evaluated based on their ability to actually complete the transaction of the auction when the auction is over. Embodiments recognize that in the case of real property, for example, a closing process has to be completed before the transaction is complete. The closing process can include financing, title, property inspection and other contingencies. Furthermore, the purchaser of a real property has to provide funds. It is not uncommon for real estate transactions to fall through after agreement is reached as to price, sometimes as a result of contingency conditions, other time simply because one party failed to follow through on his or her commitment. Bidders who have a record of being able to complete the transaction once the auction is complete can be viewed more favorably to sellers, who are generally more interested in having the transaction complete once the auction is over. Accordingly, the auction analysis component 140 can review auction records 171 of past auctions in order to determine the post-auction record of individual bidders participating in a given auction. If the auction includes bidders who have a strong record of post-auction closing, this information can be communicated by way of, for example, a score or qualitative assessment, to the seller. In this way, the information can motivate the seller to, for example, lower a reserve price to maintain a good bidder.

Predictive information can be determined for an auction based on the bidder profile information (230). In one implementation, auction analysis component 140, for example, can use profile information 155 about the particular bidder to determine predictive information about the auction on an ongoing and real-time basis. The predictive information, as determined by the auction analysis component 140, can include determining a qualitative or quantitative assessment as to whether the auction will succeed (232). This can include a determination as to whether the auction will close above the reserve price. As an alternative or addition, the determination as to whether the auction will succeed can include determining the likelihood that the winning bidder will complete the transaction (e.g., execute on the closing process, provide payment etc.) once the auction is over. For example, in the case of real property assets, a determination can be made that one or more bidders participating in the auction have a strong historical record of closing the transaction for the real property asset once the auction is over. Alternatively, the determination can be made that one or more bidders participating in the auction have a week historical record of closing their winning auctions. Based on profile information of the participating bidders, the auction analysis component 140 can communicate a determination to the seller as to whether the transaction will likely close once the auction is over. This information can be useful to the seller for a variety purposes, such as for purpose of triggering the seller to lower the reserve price in order to maintain a good bidder's participation, or to maintain a reserve price at a set amount on the assumption that the winning bidder will likely not be able to close the transaction in any case.

As an alternative or addition, the predictive information that is determined by the auction analysis component 140 can include the reserve price predictive information (234). The reserve price predictive information can identify one or more of the following: (i) whether the set reserve price at a given instance in the auction (or pre-auction) is likely to be too high or too low; (ii) a reserve price that is likely to attract bidding and result in closure of the auction; and/or (iii) a statistical determination as to whether a reserve price (or set of reserve prices) will be met by bidding activity (or alternatively whether the seller will accept the highest bid).

As still another alternative or addition, the predictive information that is determined by the auction analysis component 140 can include determining a predicted transaction price, such as provided by the top bid and the auction when the auction is over (236). The predicted transaction price can be based on, for example, past bidding activity of the bidders participating in the auction. For example, the highest bids provided by individual bidders and prior auctions can be compared to determine whether one or more of the bidders can be expected to exceed the reserve price, and if so how much the bidder can be expected to exceed the reserve price based on their historical activity. The auction analysis component 140 can determine bidder profile information corresponding to, for example, the average or median high bid of each bidder in their respective prior auction activity, the percentage of times when the individual bidder exceeded the reserve price, the percentage by which the individual bidder exceeded the reserve price, and the ratio or number of instances when the bidder won an auction.

While an example of FIG. 2 describes the predictive information as being determined from profiling bidders and their past auction activity, variations provide for the additional use of profiling the asset that is being auctioned. For example, prior transaction prices for similar assets can be compared either in the auction forum, or in a real-world environment, in order to determine comparable transactions, comparable auction prices, and to further determine information such as whether reserve pricing is realistic are likely to result in an auction sale.

The predictive information determined from the bidder profile information can be communicated to participants of the auction (240). For example, the auction analysis component 140 can communicate predictive information to the seller interface component 112 or the dashboard component 154 (242). Predictive information for the seller can include, for example, reserve price recommendations and/or probabilities, transaction price probabilities, and/or bidder assessments (e.g., indicator regarding the ability of the bidder to exceed reserve, likelihood that bidder will close transaction after auction is over, etc.). As an alternative or addition, the predictive information can be communicated to the bidder interface component 114 (244). Predictive information communicated to the bidder interface component 114 can exclude some or all of the information communicated to the seller interface component 112 (or dashboard component 154). For example, the predictive information communicated to the bidder interface component 114 can exclude specific or general information about the reserve price, such as whether the reserve price is too high or too low, or assessments about the different bidders participating in the same auction. Predictive information communicated to the bidder interface component 114 can include, for example, (i) a predicted transaction price (or probability of different transaction price), (ii) an assessment of some or all of the other bidders (e.g., indication of whether other bidders exceed reserve price typically, or information about the win loss ratio of other bidders etc.), and/or (iii) general information about the reserve price, such as the likelihood that the reserve price will be met based on the profile information of bidders or the asset of the auction.

With reference to FIG. 3, an auction forum can receive asset information from the seller (310). For example, in an implementation of real property assets, the seller can specify an address and description of the real property asset. The description can include or correlate to a category (e.g., residential home, single-family dwelling, commercial real estate etc.) and one or more subcategories (e.g., number of bedrooms, type of commercial property etc.). Based on the description, a set of characteristics are determined for the asset (312). For example, in the case of real property assets, the set of characteristics can include one or more of the following: the type of property (commercial versus residential), a subcategory of the property (e.g., condominium, single-family residence), a geographic locality of the property (e.g., ZIP Code, or specific neighborhood within ZIP Code), material characteristics used for valuation (e.g., number of bedrooms, number of baths, dwelling size, lot size, garage size, etc.), and the type of transfer (e.g., sale by owner, short sale etc.).

The relevant historical information is determined for the asset based on the set of characteristics (320). In this way, a comparable asset is identified based on the set of characteristics for the asset specified for auction by the seller (322). In one implementation, auction records 171 or queried for recent auction transactions of assets (e.g., real property assets) having the same or similar set of characteristics. As an alternative or addition, public records can be accessed and inspected in order to identify transactions of assets (e.g., real property assets) having the same or similar characteristics.

In addition to using historical information for the asset, the asset profile can also be based on externally determined information, such as relevant pricing trends for similar assets (e.g., based on property type and geographic location). Further in the case of real property assets, the external information can include, for example, the Broker Price Opinion, Seller value and/or Automated Valuation Model pricing tools.

Predictive information can be determined for an auction based on the bidder profile information (330). In one implementation, auction analysis component 140, for example, can use asset profile information 157 for comparable assets (having same or similar characteristics) to determine predictive information about the auction on an ongoing and real-time basis. The predictive information, as determined by the auction analysis component 140, can include determining a qualitative or quantitative assessment as to whether the auction will succeed (332). This assessment can include a probabilistic determination as to whether the auction will close at or above the reserve price. The determination can be based in part on the reserve price, as well as on historical data indicating whether the valuation of the asset (as can be determined from comparable assets) exceeds the reserve price. The determination can also be based on whether comparable assets were auctioned successfully (e.g., reserve price met).

As an alternative or addition, the predictive information that is determined by the auction analysis component 140 using asset profile information can include reserve price predictive information (334). Thus, the reserve price predictive information can be based on reserve prices, transaction prices, or valuations as determined from transactions of other auctions. The reserve price predictive information can identify one or more of the following: (i) whether the set reserve price at a given instance in the auction (or pre-auction) is likely to be too high or too low; (ii) a reserve price that is likely to attract bidding and result in closure of the auction; and/or (iii) a statistical determination as to whether a reserve price (or set of reserve prices) will be met by bidding activity (or alternatively whether the seller will accept the highest bid).

As still another alternative or addition, the predictive information that is determined by the auction analysis component 140 can include the determination of a predicted transaction price (336). The predicted transaction price can be based at least in part on the valuation of the asset. The valuation of the asset can be based on the transaction price of similar assets that were previously auctioned in a recent time period, and/or similar assets that were transacted in a non-auction forum.

The predictive information determined from the asset profile information can be communicated to participants of the auction (340). For example, the auction analysis component 140 can communicate predictive information to the seller interface component 112 or to the dashboard component 154 (342). Predictive information for the seller can include, for example, reserve price recommendations and/or probabilities, transaction price probabilities, and/or bidder assessments (e.g., indication in the ability of the bidder to exceed reserve, likelihood of bidder closing transaction after auction is over, etc.). As an alternative or addition, the predictive information can be communicated to the bidder interface component 114 (344). Predictive information communicated to the bidder interface component 114 can exclude some or all of the information communicated to the seller interface component 112 (or dashboard component 154). For example, the predictive information communicated to the bidder interface component 114 can exclude specific or general information about the reserve price, such as whether the reserve price is too high or too low, or assessments about the different bidders participating in the auction. Predictive information communicated to the bidder interface component 114 can include, for example, (i) a predicted transaction price (or probability of different transaction price), and/or (ii) an indicator for a reserve price.

With reference to FIG. 4, a seller can be provided predictive information (410). For example, the predictive information can be provided by the auction analysis component 140, providing output through the dashboard component 154, and/or through the seller interface component 112. As mentioned with other examples, predictive information can include input about the reserve price (which can be selected by the seller or recommended programmatically), a predicted transaction price, one or more probabilistic outcomes as to whether the auction will close after the auction is successfully completed, and/or bidder assessments (e.g., evaluations as to what individual bidders will bid or individual bidders will close the transaction after the auction is complete).

As mentioned with an example of FIG. 2, the predictive information can be based on bidder profile information (412). As an addition or alternative, the predictive information can be based on auction asset information, as shown by an example of FIG. 3 (414).

Based on the predictive information, the auction analysis component can make a recommendation as to the reserve price selection or adjustment (420). The recommendation can be to, for example, a single reserve price that balances the risk of the auction will not be successful against maximizing the revenue for the seller. For example, the recommended reserve price can correspond to a determined medium or average for comparable assets. As another example, the recommended reserve price can correspond to a median or average for comparable assets, but weighted based on bidder profile information of individual bidders who are participating in the auction. Still further, the recommended reserve price adjustment or selection can be the form of a statistical a probabilistic output, were multiple possible reserve prices are displayed to the user, along with a percentage probability (or qualitative likelihood) as to whether the reserve price will be met.

The user can then perform an action in response to receiving the predicted information. In one implementation, the action performed by the seller can include lowering the reserve price. An interface with input functionality can be provided to the seller to enable the seller to lower reserve price (430). For example, the user can provide input (see LRP 119) through the seller interface component 112 or dashboard component 154 (432) to lower the reserve price of the auction. The reserve price lowering can be performed at either a pre-auction or auction stage for the particular asset. Examples recognize that in many auction formats, the reserve price is not published to the bidders, but remain secret privy to the seller. Thus, the reserve price adjustment can correspond to an interaction between the seller and, for example, the auction manager 130, via the dashboard component 154 and/or seller interface component 112.

As an addition or alternative to lowering the reserve price, the seller can perform other actions in response to receiving predictive information. For example, the seller can generate one or more seller bids, in anticipation that once bidding begins, the active bidders will likely exceed the reserve price. In this example, the determination can be based on bidder profile information for one or more registered bidders of the particular auction. For example, the bidder profile information can identify one or more bidders whom are deemed aggressive bidders, and the presence of bidding activity can generate additional bids from the aggressive bidders.

With reference to FIG. 5, certain non-bidding activity of individual bidders can be detected through the bidder interface component 114 (510). For example, as described with an example of FIG. 1, the bidder interface component 114 can include an activity detector 116 that detects certain activity of the user. By way of example, the detected activity can include a mouse over (512), a page view (514), and/or other interactivity with an interface on which it auction is provided (516). In the latter instance, bidders can be detected as selecting links to viewing images of the asset being auctioned, entering bidding information without submitting the bid, and/or performing other tasks such as chatting through the auction site with other bidders or the seller.

The non-bidding activity of the individual bidders can be correlated to an interest metric (520). In one implementation, the auction analysis component 140 correlates the detected non-bidding activity to some metric of interest which is indicative of an amount of interest by individual bidders who are participants of the particular auction. The metric can be determined to be specific for an individual bidder, or can be indicative of the interest level of the bidders when viewed as a group. For example, a high interest by one or two bidders in a set of multiple registered bidders can reflect the interest level of all bidders. In this context, the interest metric can be high when multiple bidders have high activity levels (even when some bidders do not have high activity levels), as multiple bidders are needed to increase the price in an auction. Thus, the interest metric can reflect a high overall interest level when multiple bidders have high activity levels, under the assumption that a select set of bidders can provide sufficient bidding activity to meet and/or exceed the reserve price.

As an alternative or addition, the determined interest metric can be specific to individual bidders. For example, if a group of bidders are registered for a particular auction, non-bidding activity can be detected for each bidder in the group, and the corresponding metric can be determined specifically for each bidder.

The interest metric can be communicated to one or more participants of the auction (530). In one implementation, the interest metric is communicated to the seller (532). As an alternative or addition, the interest metric is communicated to one or more of the bidders (534). The interest metric can be representative quantitatively or qualitatively, and can represent one or more bidders anonymously or as a group. For example, a user interface feature provided as an interest bar that fluctuates to reflect value can correlate an amount of non-bidding activity by individual bidders, or by bidders of the group as a whole. The communication can indicate to the seller the likelihood that a bid will be forthcoming. If, for example, there is a lack of interest in the auction based on non-bidding activity, the seller can elect to lower the reserve price, and/or generate a seller bid for purpose of generating interest and activity in the auction.

As an alternative, the detection of non-bidding activity can be kept secret from both seller and bidders. Rather, a programmatic components such as the auction manager 130 can be signaled to initiate activity, such as seller bids 151, in order to stir interest for the auction when there is a lack of bidding and non-bidding activity (e.g., indicating lack of interest in the auction).

As shown by examples described above, the detection of non-bidding activity can be used as a signal to generate activity in the auction, and/or to perform other actions such as lower the reserve price.

Dashboard

FIG. 6 illustrates an example of a dashboard for use by a seller to manage one or more auctions. A dashboard can be generated by client application that operates on the user (seller) terminal. The client application can correspond to a standalone application, a plug-in component or extension of another program. With reference to an example of FIG. 1, the dashboard component 154 can operate on a seller terminal to generate output corresponding to a dashboard 600. The dashboard component 154 can receive input from the seller (e.g., via the seller interface component 112) corresponding to an identifier of the seller. The dashboard component 154 can communicate the identifier to a backend component of the auction forum, which in turn communicates output provided by the transaction logic to the dashboard component 154. The output can identify multiple auctions of the seller, including auctions that are in a pre-auctions stage, in-progress stage, or post-auction stage. Each auction can be associated with a record and information provided by the auction record, including current event information, can be obtained by the dashboard component and outputted as part of the dashboard 600.

In an example of FIG. 6, the dashboard component 600 is shown in tabular form. Other data formats and structure can be used to present information for the seller dashboard. In the example provided, dashboard 600 includes columns that can correspond to, for example: the seller's assets 610, the current or top bid 620, the number of bids (including delineation of seller bids) 630, the reserve price 640, and the auction end time 650 (which can be variable depending on auction rules).

Additionally, dashboard 600 can include information that correlates to or is based on predictive information. By way of example, dashboard 600 includes a suggested reserve price 612, a bidder score 614, and a probability score 616. The suggested reserve price 612 can be determined from the profile information (as described with an example of FIG. 2) and/or asset profile information (as described with an example of FIG. 3).

In the example provided, bidder score 614 represents a quantitative assessment of one or more bidders that are participating in a particular auction of the seller. In the example provided, the bidder scores for the bidder with the highest score is displayed, as well as the average bidder scores for all bidders that are registered for the auction. Numerous variations can be made to how individual scores are displayed, including for example, displaying the bidder score for all bidders registered for the auction. In one implementation, the bidder score is based at least in part on a track record of the bidder, as provided by the bidder's performance in prior auctions. The bidder score can reflect the probability (based on historical auction performance) that a particular bidder or bidders will provide a bid that exceeds the reserve price. In another implementation, the bidder score can reflect at least in part the track record of the particular bidder or bidders in terms of winning an auction that closes above the reserve price. Still further, as another example, the bidder score can reflect at least in part the track record of the particular bidder or bidders in terms of closing the transaction once the auction has been won. For example, in the case of real estate assets, once the auction is won, the real estate transaction still need to go through a closing period, were contingencies are removed, inspections are passed and the terms of the transaction are completed. The bidder score can reflect the probability that a particular bidder or bidders will complete the post-auction closing process, based on past historical data.

The probably score 616 can indicate the probability that the auction will close with the top bid that is above the reserve price. As an addition or variation, the probability score 616 can reflect whether the auction will close and the subsequent transaction will be completed in the post-auction stage. The probability score can be based on the profile information of the bidder (as described with an example of FIG. 2) and/or the profile information of the asset (as described with an example of FIG. 3).

As another example, dashboard 600 can include a column for predicted closing price 622. The predicted closing price 622 can be based in part on the asset profile information. Specifically, the valuation of the asset can be determined from auction results of similar assets, and/or marketplace valuations of similar assets. Other factors that can weight or otherwise contribute to the determination of the predicted closing price can include bidder profile information. For example, if the profile information for one or more of the bidders that are registered for an auction indicates a tendency to "lowball" an asset, then the bidder profile information can be used to weight the predicted transaction price downward. Likewise, if the bidder profile information indicates bidders who typically exceed the reserve price and are aggressive, the selected reserve price can be weighted above what would be expected from the valuation.

Still further, an example of FIG. 6 illustrates the dashboard 600 to include an auction success probability column 624. The auction success probability 624 can provide a qualitative assessment (e.g., "good" "Fair" "poor") of whether the auction will succeed. The success of the auction can correlate to whether the top bid is expected to exceed the reserve price, as determined from the profile information (as described with an example of FIG. 2) and/or the asset profile information (as determined with an example of FIG. 3).

Furthermore, in some embodiments, the dashboard 600 can be interactive, and operable to receive input. In the example provided, the reserve price column 640 can be interactive to enable the user to lower the reserve price. For example, the user may enter a new lower reserve price than the one provided in the column 640. Additionally, in some variations, an interactive column 642 may be provided to enable the user to generate a seller bid. The generation of the seller bid may be subject to rules, such as the seller bid being provided as a top bid that is below the reserve price.

Example Auction Interface

Figure 7:
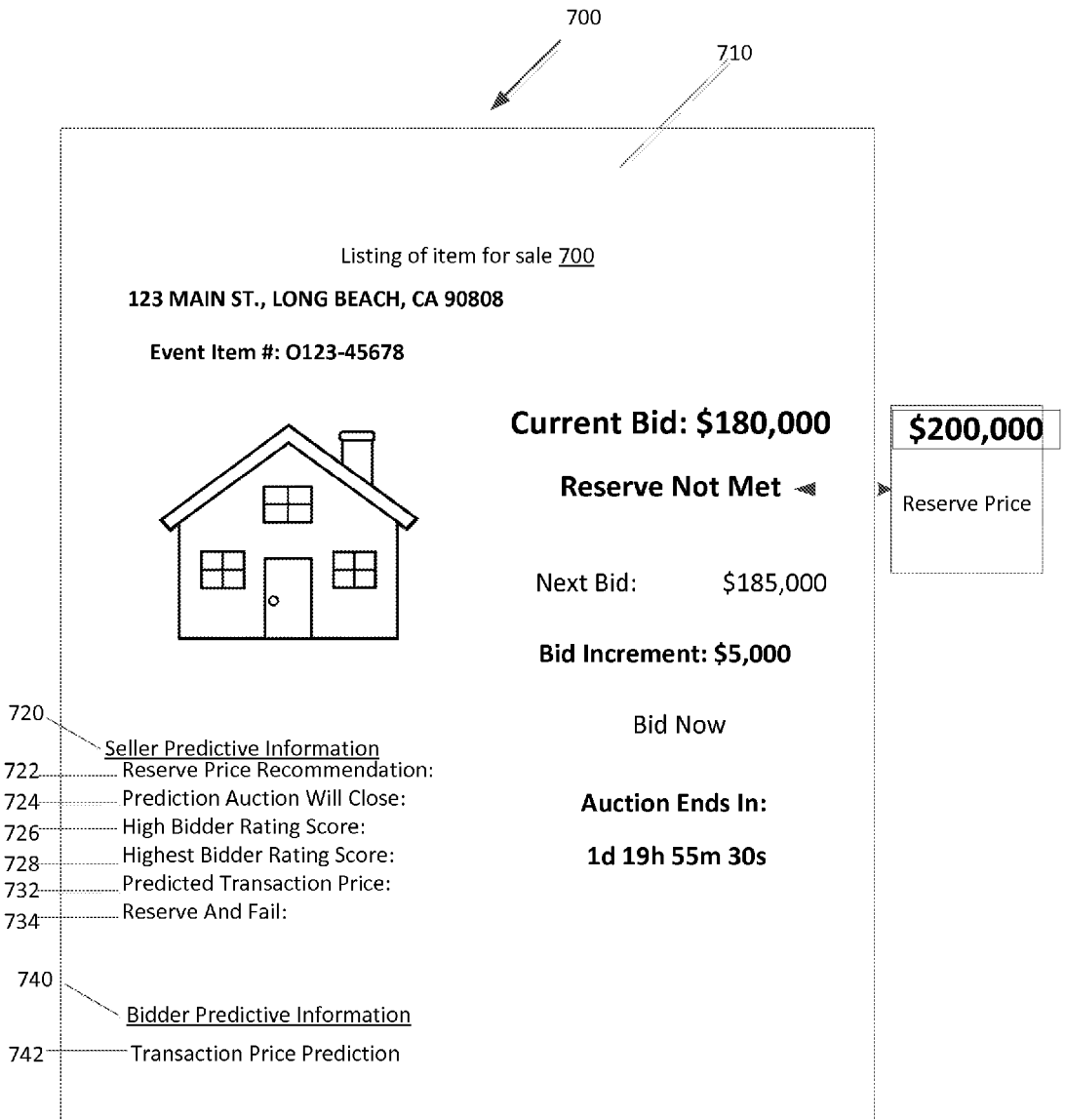
FIG. 7 illustrates an example of an auction interface that incorporates the use of predictive information.

FIG. 7 illustrates an example of an auction interface that incorporates the use of predictive information. An auction interface 700 can correspond to a webpage, provided at a network site that hosts an online auction forum. In the example provided, the auction interface 700 identifies a particular asset 710, and the auction is shown in the active auction state (when bids are received). Some content provided on the auction interface 700 can be shared between seller and bidder. For example, the information about the asset (e.g., a home), including images and text, can be displayed for all users, including bidders and the seller. Additionally, event information, such as the top bid, history of bids, the participating bidders, the bid increment, the time remaining, and other information can also be displayed for all participants of the auction. An indication of whether the reserve price has been met or not can also be shown to both bidders and the seller. However, in some implementations, the auction rules may preclude the bidders from knowing the reserve price.

In one implementation, predictive information is used to display corresponding content to the seller, but not to the bidder. Seller predictive information 720 can include, for example: (i) a reserve price recommendation 722 ; (ii) a prediction as to whether the auction will close above the reserve price 724; (iii) an assessment of one or more of the bidders, such as an assessment of the high bidder 726 (the bidder with the top bid) or alternatively the highest bidder rating score 728 (the bidder with the highest score); (iv) a predicted transaction price 732; and/02 (v) an indication 734 of the probability that the auction will close above the reserve price, but fail in the post-auction stage (e.g., due to the bidder profile information indicating high bidder having previously performed as such).

In the example provided, buyer predictive information 740 can include, for example a transaction price prediction 742. Other examples of predictive information for the buyer can include an indication as to whether the reserve price will be met, indications of other bidders performance etc. As shown by an example of FIG. 7, the predictive information displayed for the seller can vary significantly from that shown to the buyer.

Computer System

Figure 8:
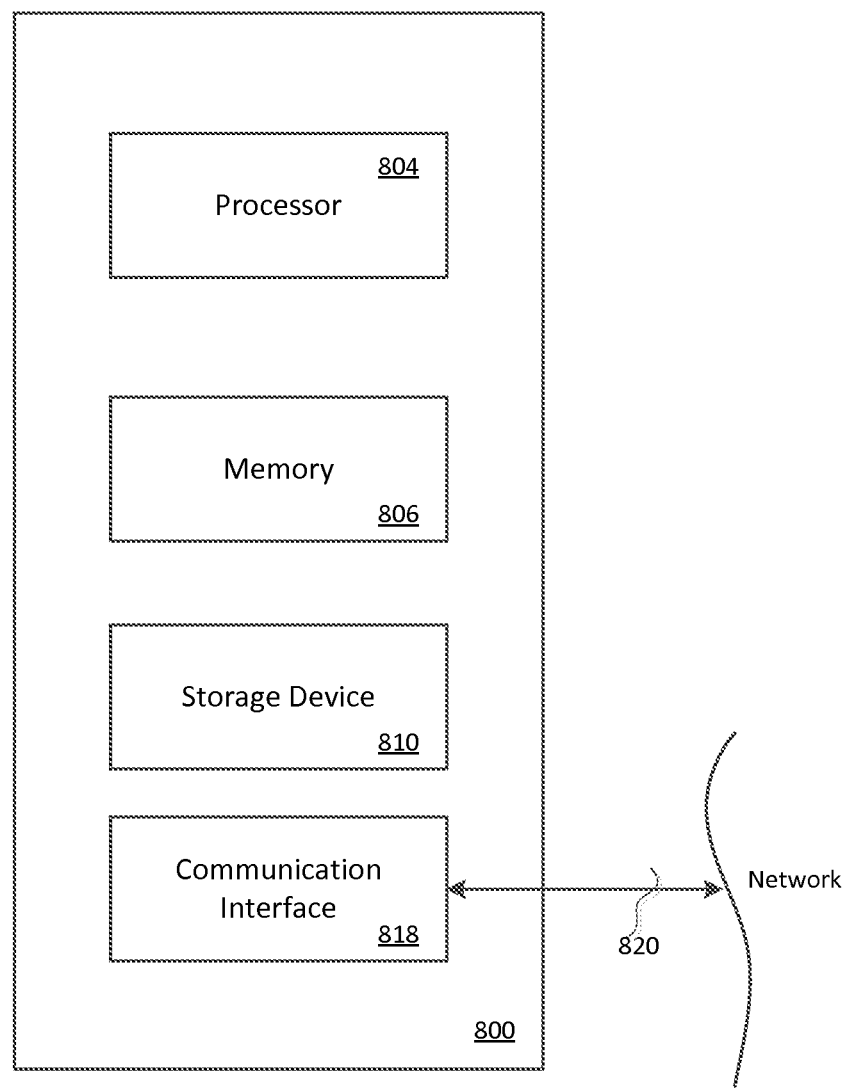
FIG. 8 is a block diagram that illustrates a computer system upon which some embodiments described herein may be implemented.

FIG. 8 is a block diagram that illustrates a computer system upon which some embodiments described herein may be implemented. For example, in the context of FIG. 1, system 100 may be implemented using one or more servers such as described by FIG. 8. Likewise, methods such as described with FIG. 2 through FIG. 5 can be implemented using a computer or server such as described with FIG. 8. Further, a dashboard (FIG. 6) or seller interface (FIG. 7) can be displayed using a computer or server such as shown with an example of FIG. 8.

In one implementation, computer system 800 includes processor 804, memory 806 (including non-transitory memory), storage device 810, and communication interface 818. Computer system 800 includes at least one processor 804 for processing information. Computer system 800 also includes the memory 806, such as a random access memory (RAM) or other dynamic storage device, for storing information and instructions to be executed by processor 804. The memory 806 also may be used for storing temporary variables or other intermediate information during execution of instructions to be executed by processor 804. The memory 806 may also include a read only memory (ROM) or other static storage device for storing static information and instructions for processor 804. The storage device 810, such as a magnetic disk or optical disk, is provided for storing information and instructions. The communication interface 818 may enable the computer system 800 to communicate with one or more networks through use of the network link 820 (wireless or wireline). The communication interface 818 may communicate with bidders and auction participants using, for example, the Internet.

Embodiments described herein are related to the use of computer system 800 for implementing the techniques described herein. According to one embodiment, those techniques are performed by computer system 800 in response to processor 804 executing one or more sequences of one or more instructions contained in memory 806. Such instructions may be read into memory 806 from another machine-readable medium, such as storage device 810. Execution of the sequences of instructions contained in memory 806 causes processor 804 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for conducting an online auction for an item, the method being implemented by one or more processors of a computer system and comprising:
   communicating over the Internet with terminals of a plurality of users, to provide a seller interface for a seller of the item, and a bidder interface for each of multiple bidders of the online auction;
   detecting, by the bidder interface executed by one or more processors, while the auction is progressing to completion, non-bidding activity of one or more of the multiple bidders with respect to the bidder interface provided to that bidder by detecting at least a first bidder of the multiple bidders hovering over a bid submission feature of the bidder interface;
   correlating, by an auction analysis component executed by one or more processors, the non-bidding activity of the one or more bidders to an interest metric that is indicative of further bidding activity by two or more bidders during the auction; and
   communicating information that is based on the interest metric to at least one of the seller by the seller interface or a bidder from the multiple bidders of the auction by the bidder interface.

2. The method of claim 1, wherein the detecting the non-bidding activity further includes detecting, by the bidder interface executed by the one or more processors, one or more of the multiple bidders refreshing a page on which the bidder interface is provided.

3. The method of claim 1, wherein the detecting the non-bidding activity further includes detecting, by the bidder interface executed by the one or more processors, one or more of the multiple bidders viewing a content of the auction provided at the online interface.

4. The method of claim 1, wherein the detecting the non-bidding activity further includes detecting, by the bidder interface executed by the one or more processors, one or more of the multiple bidders providing bidding information into the bidder interface without bid submission.

5. The method of claim 1, wherein the correlating the non-bidding activity of the one or more bidders to the interest metric further includes correlating, by the auction analysis component executed by the one or more processors, the non-bidding activity to a likelihood that a bid will be submitted by at least one of the multiple bidders.

6. The method of claim 1, further comprising communicating the information that is based on the interest metric to the seller via the seller interface executed by the one or more processors and not to any of the multiple bidders.

7. A system for conducting an online auction for an item, the system comprising:
   a memory that stores a set of instructions; and
   one or more processors that access the instructions to:
      communicate over the Internet with terminals of a plurality of users, to provide a seller interface for a seller of the item, and a bidder interface for each of multiple bidders of the online auction;
      detect, via the bidder interface and while the auction is progressing to completion, non-bidding activity of one or more of the multiple bidders of with respect to the bidder interface provided to that bidder by detecting at least a first bidder of the multiple bidders hovering over a bid submission feature of the bidder interface;
      correlate via an auction analysis component, the non-bidding activity of the one or more bidders to an interest metric that is indicative of further bidding activity by two or more bidders during the auction; and
      communicate information that is based on the interest metric to at least one of the seller via the seller interface or a bidder from the multiple bidders of the auction via the bidder interface.

8. The system of claim 7, wherein the one or more processors further detect, via the bidder interface, non-bidding activity by detecting one or more of the multiple bidders refreshing a page on which the bidder interface is provided.

9. The system of claim 7, wherein the one or more processors further detect, via the bidder interface, non-bidding activity by detecting one or more of the multiple bidders viewing a content of the auction provided at the online interface.

10. The system of claim 7, wherein the one or more processors further detect, via the bidder interface, non-bidding activity by detecting one or more of the multiple bidders providing bidding information into the bidder interface without bid submission.

11. The system of claim 7, wherein the one or more processors correlate, via the auction analysis component, the detected non-bidding activity to the interest metric by correlating the non-bidding activity to a likelihood that a bid will be submitted by one or more of the multiple bidders.

12. The system of claim 7, wherein the one or more processors communicate information that is based on the interest metric to the seller via the seller interface and not to the one or more bidders.

13. A non-transitory computer-readable medium that stores instructions for conducting an online auction for an item, the instructions being executable by one or more processors of a computer system to cause the computer system to perform operations that comprise:

communicate over the Internet with terminals of a plurality of users, to provide a seller interface for a seller of the item, and a bidder interface for each of multiple bidders of the online auction;

detect, via the bidder interface, while the auction is progressing to completion, non-bidding activity of one or more of the multiple bidders with respect to the bidder interface provided to that bidder by detecting at least a first bidder of the multiple bidders hovering over a bid submission feature of the bidder interface;

correlate, via an auction analysis component, the non-bidding activity of the one or more bidders to an interest metric that is indicative of further bidding activity by two or more bidders during the auction; and communicate information that is based on the interest metric to at least one of the seller via the seller interface or a bidder from the multiple bidders of the auction via the bidder interface.

14. The non-transitory computer-readable medium of claim 13, wherein the one or more processors further detect, via the bidder interface, the non-bidding activity by detecting one or more of the multiple bidders refreshing a page on which the bidder interface is provided.

15. The non-transitory computer-readable medium of claim 13, wherein the one or more processors further detect, via the bidder interface, the non-bidding activity by detecting one or more of the multiple bidders viewing a content of the auction provided at the online interface.

16. The non-transitory computer-readable medium of claim 13, wherein the one or more processors further detect, via the bidder interface, the non-bidding activity by detecting one or more of the multiple bidders providing bidding information into the bidder interface without bid submission.

17. The non-transitory computer-readable medium of claim 13, wherein the one or more processors correlate, via the auction analysis component, the non-bidding activity to a likelihood that a bid will be submitted by one or more of the multiple bidders.

\* \* \* \* \*